US009121787B2

(12) United States Patent
Rollinger et al.

(10) Patent No.: US 9,121,787 B2
(45) Date of Patent: **\*Sep. 1, 2015**

(54) METHOD AND SYSTEM FOR DIAGNOSING A VACUUM SYSTEM

(71) Applicant: Ford Global Technologies, LLC, Dearborn, MI (US)

(72) Inventors: John Eric Rollinger, Sterling Heights, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/926,630

(22) Filed: Jun. 25, 2013

(65) Prior Publication Data

US 2013/0283898 A1    Oct. 31, 2013

Related U.S. Application Data

(63) Continuation of application No. 13/162,481, filed on Jun. 16, 2011, now Pat. No. 8,468,879.

(51) Int. Cl.
*G01M 15/00* (2006.01)
*G01M 3/26* (2006.01)
*G01M 3/02* (2006.01)
*G01M 3/34* (2006.01)

(52) U.S. Cl.
CPC ............. *G01M 15/00* (2013.01); *G01M 3/025* (2013.01); *G01M 3/26* (2013.01); *G01M 3/34* (2013.01)

(58) Field of Classification Search
USPC ............... 73/112.01, 112.03, 114.31, 114.37, 73/114.77
See application file for complete search history.

(56) References Cited

U.S. PATENT DOCUMENTS

| 4,072,047 | A  | 2/1978  | Reismüller      |
| 4,472,962 | A  | 9/1984  | Mennenga        |
| 5,676,101 | A  | 10/1997 | Kawai et al.    |
| 5,755,101 | A  | 5/1998  | Free et al.     |
| 6,012,289 | A  | 1/2000  | Deckard et al.  |
| 6,120,414 | A  | 9/2000  | Endo et al.     |
| 6,334,834 | B1 | 1/2002  | Mizutani et al. |
| 6,735,942 | B2 | 5/2004  | Wild et al.     |
| 6,754,579 | B2 | 6/2004  | Kamiya et al.   |
| 6,857,415 | B2 | 2/2005  | Kayama et al.   |
| 6,871,918 | B2 | 3/2005  | Wild et al.     |
| 6,886,335 | B2 | 5/2005  | Tabata et al.   |
| 7,082,869 | B2 | 8/2006  | Borsch          |
| 7,216,479 | B2 | 5/2007  | Tamura          |
| 7,350,495 | B2 | 4/2008  | Harada          |
| 7,966,996 | B1 | 6/2011  | Pursifull       |
| 8,176,894 | B2 | 5/2012  | Ulrey et al.    |
| 8,353,266 | B2 | 1/2013  | White et al.    |

(Continued)

FOREIGN PATENT DOCUMENTS

EP    0899737 A2    8/1998
EP    0990793 A3    9/2000

(Continued)

*Primary Examiner* — Eric S McCall
(74) *Attorney, Agent, or Firm* — Julia Voutyras; Alleman Hall McCoy Russell & Tuttle LLP (57) ABSTRACT

A vacuum system diagnostic is disclosed. In one example, vacuum system leaks are diagnosed via a pressure reading of a vacuum reservoir. The approach may reduce the number of sensors used to diagnose vacuum system degradation.

20 Claims, 5 Drawing Sheets

(56) References Cited

U.S. PATENT DOCUMENTS

| | | |
|---|---|---|
| 2009/0064756 A1 | 3/2009 | Hong et al. |
| 2010/0036566 A1 | 2/2010 | Hayami |
| 2010/0222980 A1 | 9/2010 | Berr |
| 2012/0237366 A1 | 9/2012 | Pursifull |
| 2012/0317974 A1 | 12/2012 | Rollinger |
| 2012/0318047 A1 | 12/2012 | Cunningham et al. |
| 2013/0113270 A1 | 5/2013 | Pursifull et al. |

FOREIGN PATENT DOCUMENTS

| | | |
|---|---|---|
| EP | 1491748 A2 | 12/2004 |
| EP | 1609970 A2 | 12/2005 |

METHOD AND SYSTEM FOR DIAGNOSING A VACUUM SYSTEM

CROSS REFERENCE TO RELATED APPLICATIONS

The present application is a continuation of U.S. patent application Ser. No. 13/162,481 filed Jun. 16, 2011, now U.S. Pat. No. 8,468,879, the entire contents of which are incorporated herein by reference.

BACKGROUND/SUMMARY

A vacuum system may assist an operator or another system to actuate various vehicle systems. For example, a vacuum system may be used to assist a driver applying vehicle brakes, regulating turbocharger operation, fuel vapor purging, heating and ventilation system actuation, and driveline component actuation. However, it is possible for a vacuum system to develop a vacuum leak so that performance of the vacuum system may degrade. Further, vacuum systems can include components that may make it difficult to diagnose vacuum system leakage because the components provide some isolation within portions of the vacuum system. For example, vacuum regulators in a vacuum system may make it more difficult to determine vacuum leaks between vacuum lines upstream and downstream of the vacuum regulators.

The inventors herein have recognized the above-mentioned disadvantages and have developed a method for diagnosing a vacuum system, comprising: commanding an electric vacuum regulator supplying vacuum to a turbocharger wastegate to a vacuum level during a period of vacuum consumption less than a threshold level; and diagnosing a condition of vacuum system degradation in response to a vacuum level in a pneumatic passage extending between the electric vacuum regulator and the turbocharger wastegate.

By adjusting a duty cycle applied to an electric vacuum regulator, it may be possible to diagnose vacuum system leaks upstream and downstream of a vacuum regulator with a single sensor. In one example, a sensor used to control vacuum within a wastegate reservoir may be a basis for determining vacuum system degradation and vacuum leaks within a vacuum system. Thus, the sensor may provide more than one function so that system cost may be reduced as compared to systems that my employ multiple sensors for multiple purposes.

The present description may provide several advantages. For example, the approach may reduce cost of a vacuum system that includes diagnostics. Further, the approach can reduce system complexity since during some conditions vacuum within the system may be controlled to a single level rather than monitoring different levels of vacuum.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
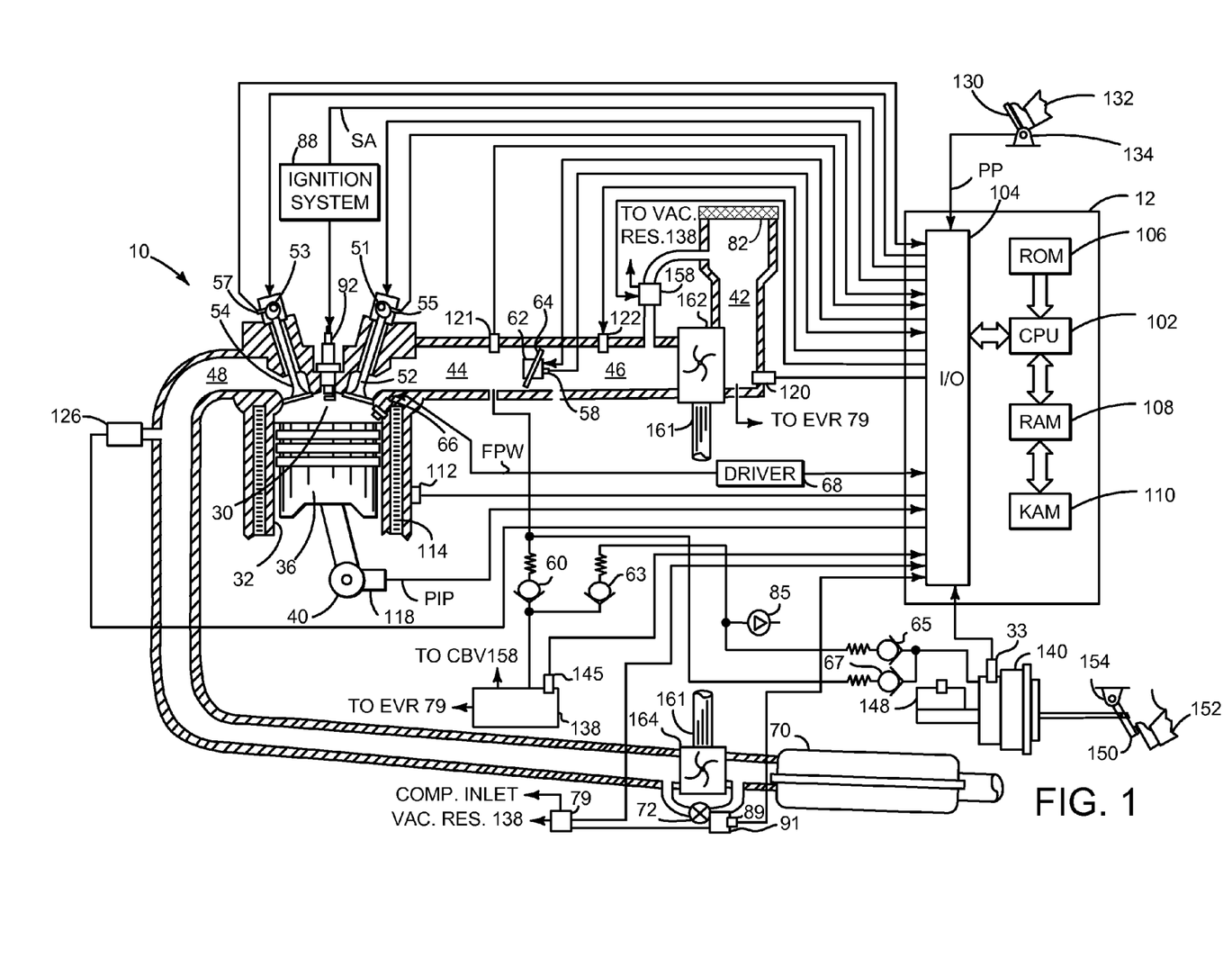
FIG. 1 shows a schematic depiction of an engine and vacuum system.
Figure 2:
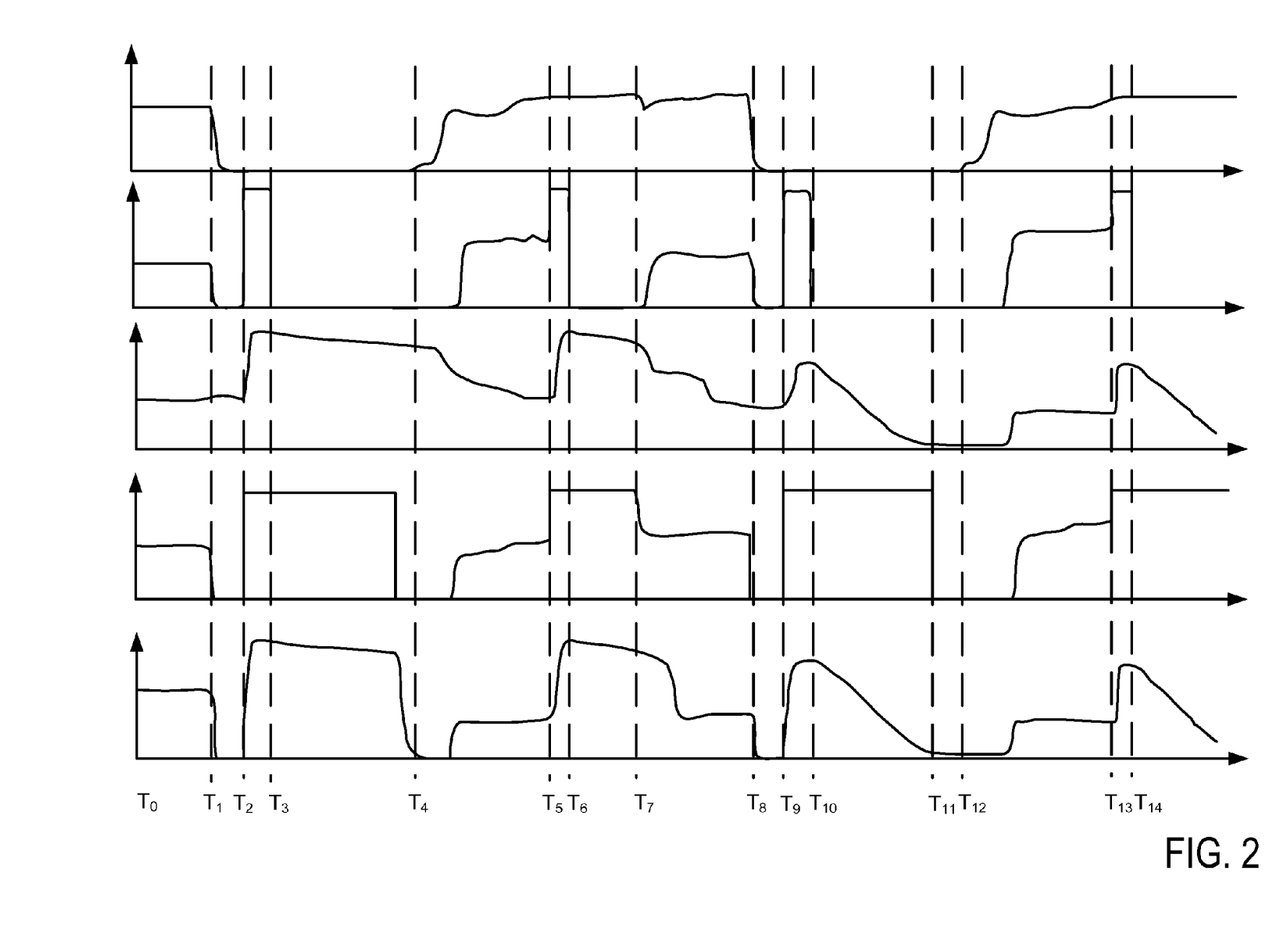
FIGS. 2-3 show simulated signals of interest during engine operation.
Figure 3:
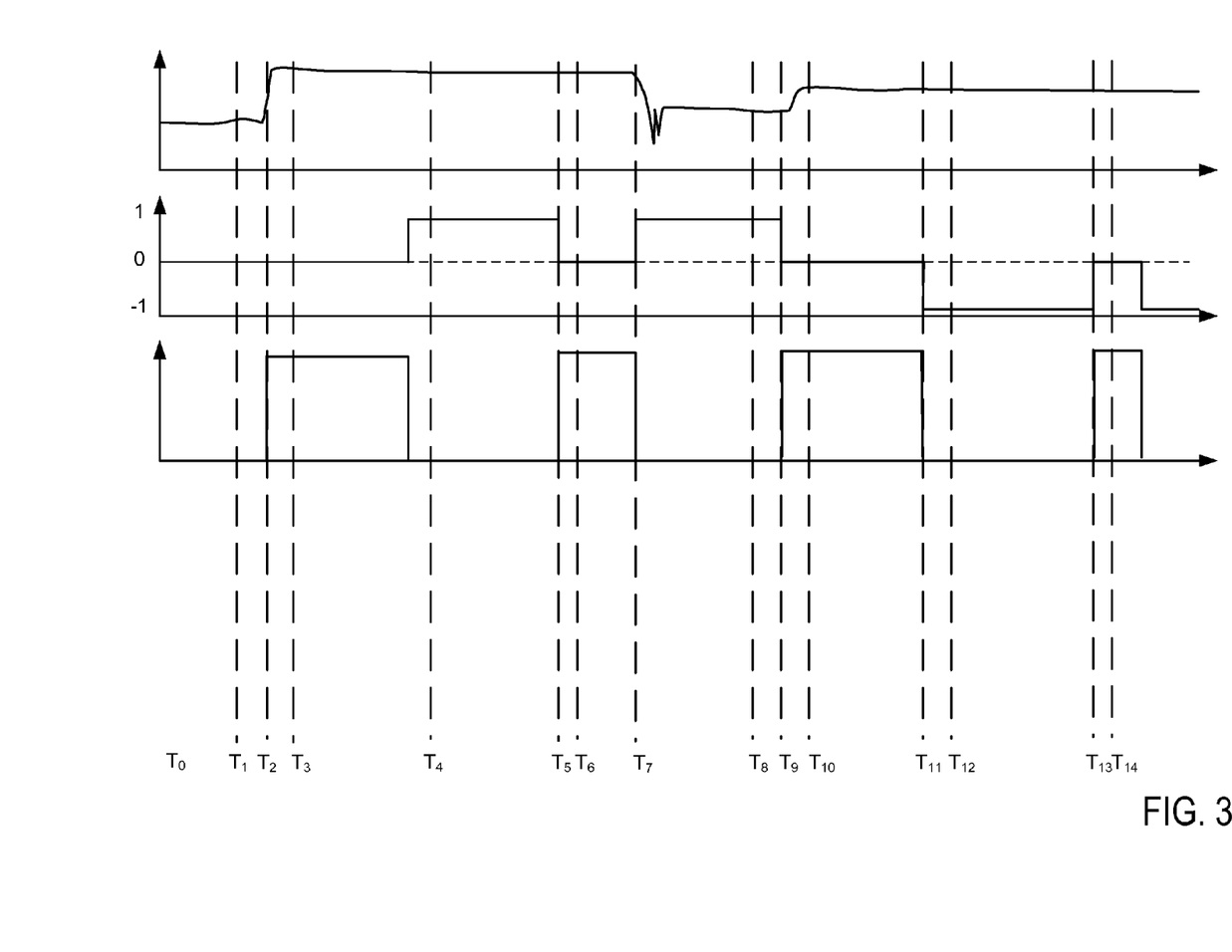
Figure 4:
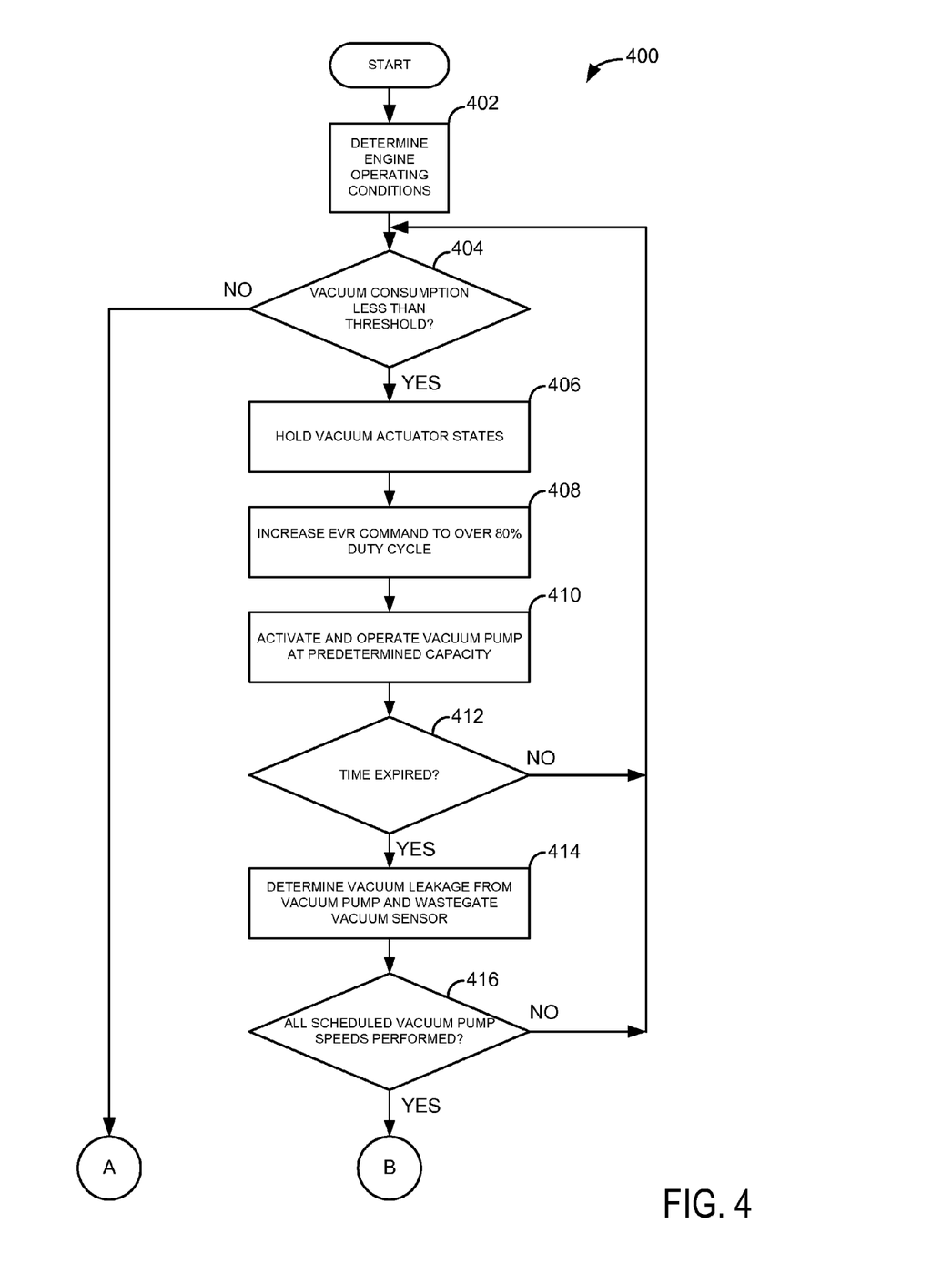
FIGS. 4 and 5 show a high level flowchart of a method for diagnosing a vacuum system of a vehicle.
Figure 5:
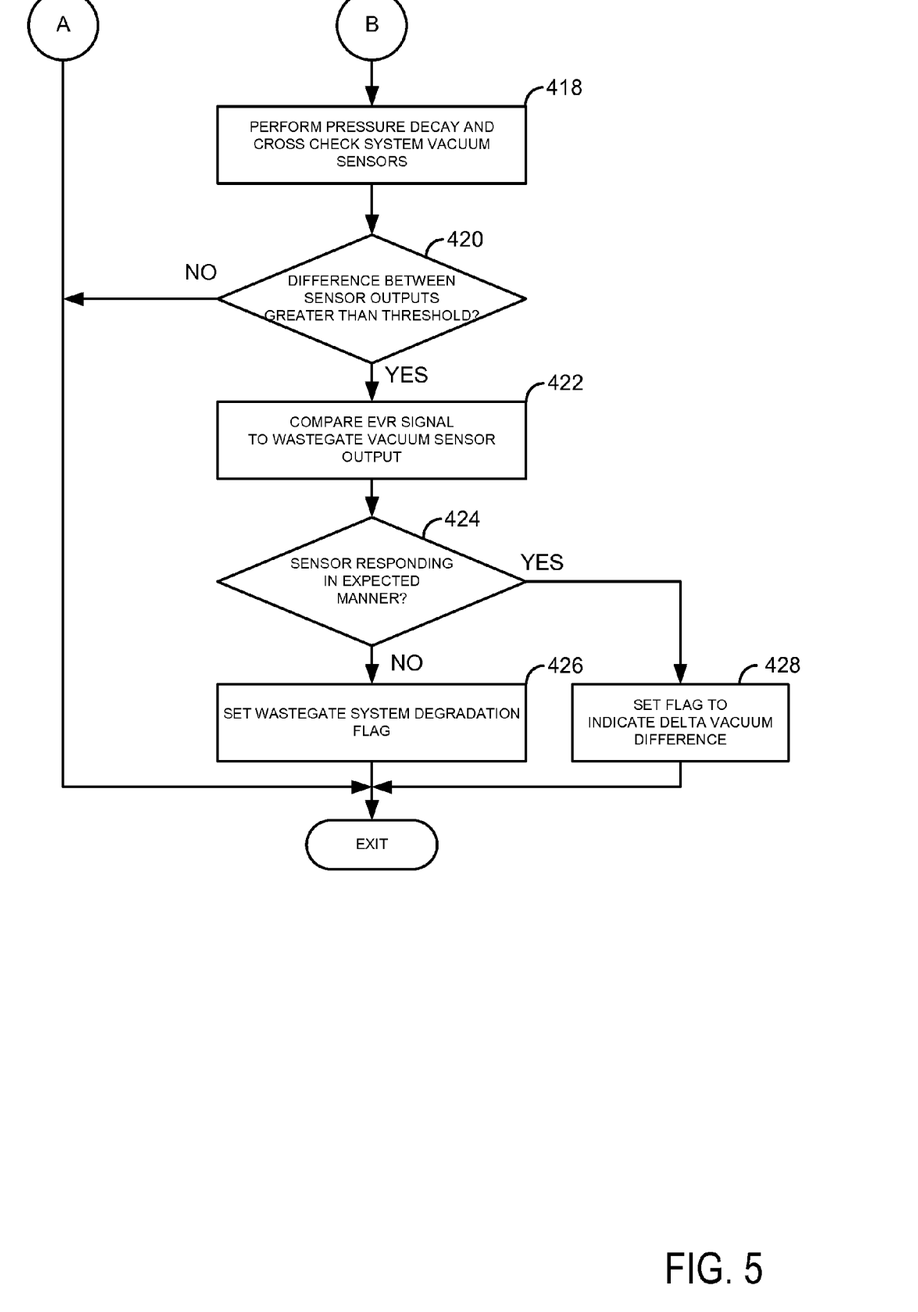

The present description is related to diagnosing vacuum system degradation. FIG. 1 shows an example vacuum system including an engine. FIGS. 2 and 3 show simulated signals of interest when diagnosing operation of a vacuum system. FIGS. 4 and 5 show a high level flowchart for assessing vacuum system degradation.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Compressor 162 draws air through air filter 82 and air intake 42 to supply boost chamber 46. Exhaust gases spin turbine 164 which is coupled to compressor 162 via shaft 161. Vacuum operated waste gate actuator 72 is supplied vacuum via wastegate vacuum reservoir 91 and it allows exhaust gases to bypass turbine 164 so that boost pressure can be controlled under varying operating conditions. Compressor bypass valve 158 is vacuum operated via vacuum supplied by vacuum reservoir 138. Boost pressure in boost chamber 46 may be reduced when compressor bypass valve 158 is opened since output of compressor 162 is fed back to the input of compressor 162.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Engine exhaust gases are directed to converter 70. Converter 70 can include multiple catalyst bricks, in one example. In another example, multiple emission control devices, each with multiple bricks, can be used. Converter 70 can be a three-way type catalyst in one example.

Vacuum for the vehicle vacuum system is stored in vacuum reservoir 138. Vacuum reservoir is in pneumatic communication with other vacuum system components via passages as shown. Vacuum may be supplied to vacuum reservoir 138 via intake manifold 44 or vacuum pump 85. Vacuum pump 85 may be electrically driven or mechanically driven via engine 10. Check valve 60 allows air to flow from vacuum reservoir 138 to intake manifold 44 and limits air flow from intake manifold 44 to vacuum reservoir 138. Similarly, check valve 63 allows air to flow from vacuum reservoir 138 to vacuum pump 85 and limits air flow from vacuum pump 85 to vacuum reservoir 138. Brake booster 140 assists operator foot 152 to apply vehicle brakes via master cylinder 148 when brake pedal 150 is depressed. Brake booster may be supplied vacuum via intake manifold 44 or vacuum pump 85 and vacuum reservoir 138. Check valve 65 allows air to flow from brake booster 140 to vacuum pump 85 and vacuum reservoir 138 while it also limits air flow from vacuum reservoir 138 to brake booster 140. Check valve 67 allows air to flow from brake booster 140 to intake manifold 44 while it also limits air flow from intake manifold 44 to brake booster 140. Brake booster 140 may also include an internal vacuum reservoir. Electric vacuum regulator 79 regulates a vacuum level in wastegate vacuum reservoir 91 via vacuum supplied from vacuum reservoir 138 and air intake 42.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; vacuum reservoir vacuum from vacuum sensor 145; wastegate reservoir vacuum from vacuum sensor 89; brake booster vacuum from vacuum sensor 33; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIGS. 2 and 3, prophetic signals of interest during vacuum system operation are shown. The signals of FIGS. 2 and 3 may be provided by the system of FIG. 1 executing the method of FIGS. 4 and 5 via instructions of controller 12. The sequences illustrated in FIGS. 2 and 3 occur at the same time and under the same conditions. Vertical markers $T_0$-$T_{14}$ are provided to indicate conditions of interest during the sequence and represent the same times in FIGS. 2 and 3.

The first plot from the top of FIG. 2 represents engine speed versus time. The X axis represents time and time increases from the left to right side of the plot. The Y axis represents engine speed and engine speed increases in the direction of the Y axis arrow.

The second plot from the top of FIG. 2 represents vacuum pump speed versus time. The X axis represents time and time increases from the left to right side of the plot. The Y axis represents vacuum pump speed and vacuum pump speed increases in the direction of the Y axis arrow. The vacuum supply capacity of the vacuum pump can increase with increasing vacuum pump speed.

The third plot from the top of FIG. 2 represents system reservoir vacuum versus time. The X axis represents time and time increases from the left to right side of the plot. The Y axis represents system reservoir vacuum and vacuum increases in the direction of the Y axis arrow. The system vacuum reservoir may be as indicated at 138 of FIG. 1, and it may be in pneumatic communication with an intake manifold, vacuum pump, and wastegates as shown in FIG. 1.

The fourth plot from the top of FIG. 2 represents an electric vacuum regulator (EVR) command versus time. The X axis represents time and time increases from the left to right side of the plot. The Y axis represents EVR duty cycle and duty cycle increases in the direction of the Y axis arrow. The EVR may be configured as indicated at 79 of FIG. 1, and it may be in pneumatic communication with the vacuum reservoir of vacuum operated wastegate actuator 91 as shown in FIG. 1.

The fifth plot from the top of FIG. 2 represents wastegate reservoir vacuum versus time. The X axis represents time and time increases from the left to right side of the plot. The Y axis represents wastegate reservoir vacuum and vacuum increases in the direction of the Y axis arrow. The wastegate vacuum reservoir may be as indicated at 91 of FIG. 1 and it may hold vacuum to operate vacuum operated wastegate actuator 72 as shown in FIG. 1.

The first plot from the top of FIG. 3 represents brake booster vacuum versus time. The X axis represents time and time increases from the left to right side of the plot. The Y axis represents brake booster vacuum and vacuum increases in the direction of the Y axis arrow. The brake booster vacuum reservoir may be as indicated at 140 of FIG. 1.

The second plot from the top of FIG. 3 represents a vacuum system diagnostic status flag versus time. The X axis represents time and time increases from the left to the right side of the plot. The Y axis represents vacuum system status. A value of one indicates passing a vacuum diagnostic. A value of minus one indicates a condition of vacuum system degradation. A value of zero indicates that a diagnostic test is in progress, incomplete, or has not been performed.

The third plot from the top of FIG. 3 represents a vacuum system diagnostic mode flag versus time. The X axis represents time and time increases from the left to the right side of the plot. The Y axis represents vacuum system diagnostic mode. A value of zero indicates no vacuum system diagnostic system evaluation is presently being performed. A value of one indicates that a vacuum system diagnostic system evaluation is presently being performed.

At time $T_0$, engine speed is at a middle level and the engine is operating. The vacuum pump is also activated to provide vacuum to the system vacuum reservoir. The EVR command is also at a middle level so as to adjust the position of a turbocharger wastegate to a level that provides a desired level of boost to a boost chamber of the engine. The wastegate reservoir vacuum is also shown at a middle level. Vacuum may be consumed by the vacuum consumers of the vacuum system under the illustrated conditions. The brake booster vacuum is shown at a middle level and it indicates that vacuum is available for the application of vehicle brakes. The vacuum system diagnostic status flag is shown at a level of zero and it indicates that the vacuum system has not passed a vacuum diagnostic nor is vacuum system degradation indicated. The vacuum system diagnostic mode flag is at a level of zero and it indicates that a vacuum system diagnostic is not presently being performed.

At time $T_1$, engine speed is reduced and the engine stops shortly thereafter. The vacuum pump speed is also reduced to zero. The vacuum pump may be driven by the engine or it may be electrically driven. The system reservoir vacuum stays at a substantially constant level as vacuum consumers hold vacuum actuators at their present state or move the vacuum actuators to a lower vacuum use state. The EVR command goes to a low level as the engine is stopped. The vacuum level in the wastegate vacuum reservoir goes to a low level and the wastegate moves to a closed position as engine speed goes to zero. The brake booster vacuum remains at its level prior to engine speed reaching zero. Vacuum levels may be maintained in the brake booster and in the system vacuum reservoir via check valves as shown in FIG. 1. The vacuum system diagnostic status flag and the vacuum system diagnostic mode flag remain at a level of zero.

At time $T_2$, a vacuum system diagnostic is initiated as shown by the vacuum system diagnostic mode flag transitioning to a level of one. The vacuum diagnostic is started with the engine off. The vacuum pump is shown operated at rated speed; however, in some examples the vacuum pump may be operated at a lower speed. Further, in some examples, the vacuum pump speed may be increased in several increments such that engine speed is stepped from a low speed to a higher speed. The system reservoir vacuum increases in response to the vacuum pump being activated. The EVR is also commanded to a duty cycle greater than 80%. By increasing the duty cycle of the EVR to a level greater than 80%, the vacuum level at the outlet of the EVR is substantially the vacuum level at an inlet of the EVR. When the vacuum level at the outlet of the EVR is substantially the same as a vacuum level input to the EVR, it may be possible to use a single vacuum sensor located between the EVR and the wastegate to track vacuum in the vacuum system without having to use a second vacuum sensor. The vacuum level in the wastegate vacuum reservoir increases in response to activating the vacuum pump and operating the EVR with a duty cycle in excess of 80%. In particular, the wastegate vacuum level may be substantially the same as the system reservoir vacuum level. Similarly, the brake booster vacuum level increases. The brake booster vacuum level increases because check valves (e.g., check valve 67 of FIG. 1) in the vacuum system allows the brake booster to hold vacuum to the level of the lowest vacuum in the vacuum system. The vacuum system diagnostic status flag remains at a level of zero as the vacuum diagnostic is being performed.

Between time $T_2$ and time $T_3$, the level of vacuum achieved is compared to the vacuum pump speed as described at 414 of FIG. 4. If a system has a vacuum leak, the vacuum pump may not be able to pump the system vacuum reservoir down to the same level as if no vacuum leak where present. Thus, by operating the vacuum pump and measuring a vacuum level in the vacuum system, it may be determined if vacuum is leaking from the system.

In this way, during a period of vacuum pump operation with all controllable vacuum consumers in a low vacuum consumption state, a pressure ratio of vacuum sensor/barometric pressure can be compared to a threshold level. If the threshold level is exceeded a leak may be determined.

At time $T_3$, the vacuum pump is stopped. Stopping the vacuum pump allows the diagnostic to determine the vacuum loss over a predetermined amount of time. For example, if the vacuum held in the vacuum system is reduced by 0.01 bar over one minute it may be determined that vacuum decay rate is within limits. However, if the vacuum held in the system is reduced by 0.1 bar over one minute it may be determined that the vacuum decay rate is above a predetermined limit.

Between time $T_3$ and time $T_4$, the engine remains stopped, the vacuum pump is off, the EVR duty cycle is commanded to a value greater than 80%, and vacuum levels within the vacuum system are allowed to decay. In some examples, the duty cycle is set to 100% to eliminate communication to a vent port of the EVR. The allocated vacuum system decay time may be a predetermined amount of time that varies with vehicle operating conditions. For example, the amount of time may be decreased as ambient temperature decreases.

Any vacuum leaks in the vacuum system reduce the capability of the vacuum pump to reach very high vacuum levels. However, when the vacuum pump is stopped, the brake booster and the system vacuum reservoir are separated via check valves and the brake booster and the system vacuum reservoir may be separately leak tested.

The vacuum system diagnostic ends before time $T_4$ is reached as indicated by the vacuum system diagnostic mode flag transitioning from a higher level to a lower level. In addition, the EVR command is deactivated after the diagnostic is complete. The vacuum level at the end of the vacuum system diagnostic is compared to a predetermined vacuum level. If the level of vacuum in the vacuum system is less than the predetermined level, an indication of vacuum system degradation may be provided. In the present example, vacuum system degradation is not indicated before time $T_4$. Rather, the vacuum system diagnostic status flag transitions to a value of one to indicate passing the vacuum system diagnostic. In this way, a vacuum system diagnostic may be performed while an engine of the vehicle is turned off. The vacuum level in the wastegate vacuum reservoir also goes to a low level and the wastegate moves to a closed position after the EVR command goes to a zero duty cycle.

At time $T_4$, the engine is restarted. Shortly thereafter, the vacuum pump is reactivated and the system reservoir vacuum begins to decrease as vacuum is consumed via vacuum consumers (e.g. heating and ventilation actuators and fuel vapor purge system vacuum uses). As the engine speed increases the waste gate is also commanded to a position by outputting a duty cycle to the EVR. The vacuum level at the wastegate reservoir increases and the wastegate is moved to the desired position. The vacuum pump speed is commanded to a middle level where the vacuum pump can meet the vacuum requirements of vacuum consumers without providing excess vacuum. The vacuum system diagnostic status flag remains high indicating no vacuum system degradation. The vacuum system diagnostic mode flag remains at a value of zero indicating the absence of executing a vacuum system diagnostic. The vacuum diagnostic may be prevented from executing when a vacuum amount greater than a threshold amount is being consumed from the vacuum system.

At time $T_5$, the vacuum system diagnostic mode flag transitions to a higher state and it indicates execution of a vacuum system diagnostic while the engine is operating. In some examples, the vacuum system diagnostic may be performed during selected operating conditions such as vacuum consumption within the vacuum system being less than a threshold level. The vacuum system diagnostic status flag transitions to a lower level in response to executing an engine running vacuum system diagnostic. The vacuum pump is also command to a higher speed so as to draw the vacuum in the system to a higher vacuum level. The EVR is also commanded to a duty cycle greater than 80% so that a sensor positioned between the EVR and the wastegate reservoir can sense a vacuum level of the system vacuum reservoir. The vacuum in the system vacuum reservoir and the wastegate reservoir increases in response to increased vacuum pump speed and the EVR command.

For systems where a high vacuum in the wastegate actuator results in an open wastegate, the diagnostic may operate as follows. If the wastgate is commanded fully open via the EVR, a command of 80% to 100% duty cycle can be applied to the EVR so that maximum vacuum is delivered to the wastegate reservoir if the diagnostic is run.

For systems where a high vacuum in the wastegate actuator results in a closed wastegate, the diagnostic may operate as follows. If the wastgate is commanded fully closed via the EVR, a command of 80% to 100% duty cycle can be applied to the EVR so that maximum vacuum is delivered to the wastegate reservoir if the diagnostic is run.

Between time $T_5$ and time $T_6$, the level of vacuum achieved is compared to the vacuum pump speed as described at 414 of FIG. 4. It should be mentioned that the vacuum pump may be operated at the higher speed for a shorter amount of time while the engine is running so that the vacuum system diagnostic may be performed in a shorter time interval than if the vacuum system diagnostic is executed during engine off time. Further, other diagnostic parameters may be varied between when a diagnostic is executed during engine off and during engine on conditions.

At time $T_6$, the vacuum pump is deactivated and the vacuum decay rate in the vacuum system is determined. In one example, the vacuum decay rate is determined by monitoring the vacuum in the vacuum system via a sensor positioned in a pneumatic conduit positioned between an EVR and a wastegate vacuum reservoir for a predetermined amount of time. The vacuum decay rate between time $T_6$ and $T_7$ is relatively low in the present example.

At time $T_7$, engine speed is decreased and vacuum consumption increases as indicated by the decreasing vacuum level in the brake booster. The vacuum consumption rate can be increased by application of vehicle brakes or via another vacuum consumer. The vacuum level in the system vacuum reservoir also decreases as air flows from the brake booster to the system vacuum reservoir. The increase in vacuum consumption causes the diagnostic to exit. Further, the vacuum pump is activated and the EVR command is adjusted to a value based on engine operating conditions. The vacuum system diagnostic status flag goes to a value of one indicating that leakage of less than a predetermined amount has been established. The leakage rate may be based on the vacuum decay rate and/or the level of vacuum achieved by the vacuum pump. The vacuum system diagnostic mode flag also transitions from a higher level to a lower level in response to the increase in vacuum consumption and exiting the vacuum diagnostic. In this way, the vacuum system diagnostic may be interrupted.

Once either the brake system or the wastegate reservoir system is pumped down, the vacuum decay leak diagnostic can continue, until vacuum is consumed from one of the sources. The diagnostic may abort if brake vacuum is consumed or the vacuum pump is activated. The diagnostic may also abort if wastegate vacuum is consumed or the pump is activated.

Between time $T_7$ and time $T_8$, vacuum continues to be consumed by vacuum consumers (e.g., ventilation controls and fuel vapor controls) and a small vacuum leak develops. Consequently, the vacuum pump remains active and the vacuum level in the system vacuum reservoir decays to a lower level than previously indicated with the vacuum pump operating. The EVR is commanded to a middle level based on engine operating conditions. The wastegate reservoir vacuum level also remains at a middle level in response to the EVR command. The brake booster vacuum stays at a relatively high level of vacuum after air from a braking event has been drawn from the brake booster.

At time $T_8$, the engine is stopped and the EVR command duty cycle goes to zero. The vacuum in the wastegate reservoir decays and the wastegate assumes a closed position. Further, the vacuum pump is commanded off and vacuum in the system vacuum reservoir is held via check valves. The vacuum system diagnostic mode flag remains at a low level to indicate no vacuum system diagnostic is presently ongoing.

At time $T_9$, it is determined that conditions have been met to initiate a vacuum diagnostic during the engine off state. Therefore, the vacuum system diagnostic mode flag transitions to a higher level and the vacuum system diagnostic flag is transitioned to a value of zero to indicate that status of degradation of the vacuum system has not been established. The EVR command is increased to a duty cycle of higher than 80% and the vacuum pump is activated. The vacuum pump removes air from the system vacuum reservoir, the wastegate reservoir, and the brake booster.

Between time $T_9$ and time $T_{10}$, the amount of vacuum in the system reservoir as determined via a sensor positioned between the wastegate and the EVR is compared to vacuum pump speed. Since there is a small vacuum leak in the system, the vacuum level in the system reservoir between time $T_9$ and $T_{10}$ is lower than the vacuum level observed between time $T_2$ and $T_3$ during similar conditions. Accordingly, it may be determined from the system reservoir vacuum and the pump speed that a vacuum leak is present.

At time $T_{10}$, the vacuum pump is stopped to begin the vacuum decay evaluation. After the vacuum pump is stopped and up until time $T_{11}$, the EVR duty cycle is maintained and vacuum is lost in the system as a result of the vacuum leak. Consequently, the system reservoir and the wastegate reservoir vacuum levels decay at a higher rate than previously shown. Accordingly, the vacuum decay rate increases and it may be established that vacuum system degradation is present.

At time $T_{11}$, the vacuum diagnostic is suspended and the EVR duty cycle is reduced to zero. In addition, since the vacuum decay rate is higher than a threshold level and since the vacuum level achieved while the vacuum pump was active is reduced, the vacuum system diagnostic status flag is transitioned to a value of minus one to indicate vacuum system degradation. The vacuum system diagnostic mode flag is also transitioned from a higher level to a lower level to indicate that the vacuum system diagnostic is complete. The vacuum level in the system reservoir and the wastegate reservoir decrease until substantially ambient pressure is reached. The vacuum level in the brake booster may be retained via check valves.

At time $T_{12}$, the engine is restarted. Shortly thereafter, the vacuum pump is also reactivated and the EVR duty cycle is increased in response to engine operating conditions. Operating the vacuum pump increases the vacuum level in the system vacuum reservoir and the wastegate reservoir. The vacuum system diagnostic status flag remains at a value of minus one to indicate vacuum system degradation. The vacuum system diagnostic mode flag remains at a low level since vacuum is being consumed and since a diagnostic has been recently completed.

At time $T_{13}$, an engine running vacuum system diagnostic is initiated as indicated by the vacuum system diagnostic mode flag transitioning from a lower state to a higher state. The vacuum pump is driven to rated speed and the EVR is commanded with a duty cycle that exceeds 80%. As a result, the system reservoir vacuum increases as does the wastegate reservoir vacuum. However, the system reservoir vacuum and the wastegate reservoir vacuum are lower than the vacuum level between times $T_5$ and $T_6$ as a result of the vacuum leak. Therefore, when the vacuum pump speed and the vacuum level in the system reservoir are compared, it may be determined that leakage higher than a predetermined rate is present.

At time $T_{14}$, the vacuum pump is stopped and vacuum in the system reservoir is allowed to decay. Since a vacuum leak is present in the vacuum system, vacuum decays at a higher rate than expected for a system without a leak. Since a vacuum leak may be detected from the vacuum decay rate and from comparing the vacuum pump speed and the system vacuum, the vacuum system diagnostic status flag is transitioned to a value of minus one to indicate vacuum system degradation. Further, the vacuum system diagnostic mode flag is transitioned to a value of zero to indicate that the vacuum system diagnostic is complete.

Thus, the sequence shown in FIGS. 2 and 3 shows executing a vacuum system diagnostic when an engine is stopped and while the engine is running. Further, the diagnostic may include a vacuum decay portion and a comparison of vacuum pump speed with system reservoir vacuum level.

Referring now to FIGS. 4 and 5, a method for diagnosing a vacuum system of a vehicle is shown. The method FIGS. 4 and 5 may be executed via instructions of a controller in a system as shown in FIG. 1. Further, the method of FIGS. 4 and 5 may provide the operating sequence illustrated in FIGS. 2 and 3.

At 402, method 400 determines engine operating conditions. Engine operating conditions may include but are not limited to engine speed, engine air amount, engine temperature, ambient temperature, and ambient pressure. If it is determined that the engine is operating, a first group of parameters may be selected. If it is determined that the engine is not operating, a second group of parameters different than the first group of parameters may be selected. In this way, two different operating modes (e.g., engine off and engine running modes) may be provided. In one example, the parameters for the engine running mode provide for a shorter duration vacuum system diagnostic. Further, in some examples, the speed at which the vacuum pump is driven may be varied. And, if the vacuum pump is engine driven, only a vacuum decay diagnostic may be performed during engine off conditions rather than a vacuum pump on diagnostic and a vacuum decay diagnostic. Method 400 proceeds to 404 after engine operating conditions are determined.

At 404, method 400 judges whether or not a vacuum consumption level for the vacuum system is less than a threshold level. It may be desirable to establish that the vacuum consumption level is low so that interference with operation of other systems is reduced. Further, when the vacuum consumption rate is low, a more representative vacuum decay rate may be determined. If it is judged that the vacuum consumption rate is less than a threshold, method 400 proceeds to 406. Otherwise, method 400 proceeds to exit.

At 406, method 400 commands all vacuum consumers to hold their present state or to enter a low vacuum consumption state. Vacuum states are held substantially constant for vacuum consumers that consume little or no vacuum while at steady state conditions. In this way, method 400 can reduce the vacuum consumption rate during the vacuum diagnostic. Method 400 proceeds to 408 after the vacuum actuator states are placed on hold status.

At 408, method 400 increases the EVR duty cycle command to over 80%. When the duty cycle is commanded to a higher level, the vacuum level at the EVR outlet is substantially the same as the vacuum level at an input of the EVR. As a result, EVR inlet vacuum can be sensed via a sensor located at the outlet of the EVR. For example, sensor 89 of FIG. 1 may measure vacuum in system reservoir 138 of FIG. 1 when EVR is commanded with a duty cycle greater than 80%. In this way, vacuum can be measured at system reservoir 138 without having to place a vacuum sensor in system reservoir 138. By commanding the wastegate actuator to full vacuum via the EVR, the wastegate is put in a given position (open or closed). The diagnostic is activated when the EVR is commanded to full vacuum during engine operating conditions that dictate full EVR vacuum. Therefore, engine operation is not affected. Method 400 proceeds to 410 after the EVR is commanded with a duty cycle that exceeds 80%. Note that the EVR duty cycle of 80% described may vary from EVR to EVR and therefore the 80% figure is not to be considered as limiting in any manner.

At 410, method 400 activates and operates a vacuum pump. In examples, where the vacuum pump is electrically driven, the vacuum pump may be activated when an engine of the vehicle is off or running. If the vacuum pump is driven by the engine, the vacuum pump may remain stopped when the vacuum system is diagnosed during engine stop conditions. In some example, the vacuum pump is driven at rated speed so that a high level of vacuum may be provided. Further, in some examples, the vacuum pump speed may be increased in several steps so that the vacuum level in the system vacuum reservoir may be compared to the vacuum pump speed for several vacuum speeds. By adjusting the speed of the vacuum pump, the vacuum pump may be operated at several levels of pump capacity. The vacuum capacity of the vacuum pump is determined from an empirically determined function or table that describes vacuum pump capacity as a function of vacuum pump speed. If the vacuum pump is driven by the engine, the vacuum pump capacity is based on the engine speed. In addition, the vacuum pump speed profile may be different between conditions where the engine is running and where the engine is stopped. Method 400 proceeds to 412 after the vacuum pump is activated at a predetermined capacity.

At 412, method 400 judges whether or not a delay time has expired. The delay time allows the vacuum pump to pump the vacuum system down to a steady state vacuum level. If the delay time has not expired, method 400 returns to 404. Otherwise, method 400 proceeds to 414.

At 414, method 400 determines vacuum leakage from the vacuum system in response to vacuum pump speed and system vacuum as determined from a vacuum sensor (e.g. sensor 89 in FIG. 1). In one example, vacuum pump speed is determined and input to a table or function that outputs a volumetric vacuum flow rate. The volumetric vacuum flow rate is multiplied by a ratio of vacuum in the vacuum system to barometric pressure and the output is a volume leak rate. The volume leak rate is compared with a predetermined value. If the predetermined value is exceeded, it may be determined that there is a vacuum leak in the vacuum system. Method 400 proceeds to 416 after it is determined whether or not a vacuum leak is present in response to vacuum pump speed and system vacuum level.

At 416, method 400 judges whether or not all scheduled vacuum pump speeds have been performed. If vacuum pump speeds are to be incrementally increased, and the vacuum pump has not been operated at all desired vacuum pump speeds, method 400 returns to 404 so that vacuum pump speed may be increased at 410. Otherwise, method 400 proceeds to 418.

At 418, method 400 performs pressure decay diagnostic. The pressure decay diagnostic may include stopping the vacuum pump as illustrated in FIGS. 2 and 3 and sealing the vacuum system. If the vacuum pump is an electrically driven pump, the vacuum pump may be stopped by removing electrical power from the vacuum pump. If the vacuum pump is mechanically driven by the engine, the vacuum pump may be stopped by opening a clutch between the vacuum pump and the engine. Once the vacuum pump is stopped, a first vacuum sample from the vacuum system is recorded at a first time. A second vacuum sample is recorded subsequently at a second time. If the vacuum level at the second time is less than the vacuum level at the first time by more than a predetermined amount, it may be determined that a vacuum leak is present in the vacuum system. The amount of time allocated between first and second vacuum samples may be determined based on operating conditions.

A cross check or correlation of vacuum system sensors may also be performed. In one example, a vacuum sensed by a brake booster vacuum sensor (e.g., 33 of FIG. 1) is compared to a vacuum sensed by a wastegate boost reservoir sensor (e.g., 89 of FIG. 1). The vacuum levels sensed between the two sensors may be checked near the time the vacuum pump is turned off. Since the brake booster holds the lowest vacuum level and sense vacuum in the system may be at its lowest level when the vacuum pump is on, the brake booster sensor and the wastegate sensor may be in agreement during pump on conditions when the vacuum level is high. Method 400 proceeds to 420 after outputs of different sensors in the vacuum system have been determined.

At 420, method 400 judges whether or not any differences between vacuum system sensors is greater than a predetermined amount. If so, method 400 proceeds to 422. Otherwise, it may be determined that the sensors are reading substantially the same conditions. Consequently, it may be determined that the sensors are operating as is desired. If the engine is running, method 400 may exit whether or not there is a difference between sensor outputs so that engine operation may not be interrupted.

At 422, method 400 varies a duty cycle command sent to the EVR so that vacuum between the EVR and the wastegate vacuum reservoir can be adjusted. In one example, the EVR duty cycle may be adjusted from a higher duty cycle (e.g., greater than 80%) to a lower duty cycle (e.g., less than 30%). Alternatively, the EVR duty cycle may be adjusted from a lower duty cycle to a higher duty cycle. The EVR duty cycle is adjusted to determine if the output of the vacuum sensor varies according to the changes in EVR duty cycle. In this way, it may be determined if degradation of the EVR or vacuum sensor may be present.

At 424, method 400 judges whether or not the output of a vacuum sensor located in the wastegate vacuum reservoir and the EVR duty cycle perform as expected. For example, if the duty cycle supplied to the EVR is increased, it may be expected that the vacuum level observed at the vacuum sensor will increase. If the sensor responds as expected to the varying EVR duty cycle, method 400 proceeds to 428. Otherwise, method 400 proceeds to 426.

At 428, a flag is set to indicate a difference between outputs of different vacuum sensors. Since the wastegate vacuum sensor operated as expected, it may be indeterminate where the source of the sensor output difference originates. For example, the wastegate vacuum sensor output may follow the EVR command; however, the sensor output may be higher or lower than is expected. Alternatively, the brake booster vacuum signal may output a value that is higher or lower than is expected. Consequently, the condition is identified so that further diagnostics may be performed. The flag may be a basis for setting a vacuum system diagnostic status flag as described in FIG. 3. Method 400 exits after the flag indicating a difference between outputs of different vacuum sensors is set.

At 426, a wastegate system degradation flag may be set to indicate degradation of the waste gate system. If it is determined at 424 that the wastegate vacuum sensor output does not follow the EVR command, the vacuum sensor or the EVR may be degraded. Therefore, a wastegate system degradation flag may be asserted so that a technician may be directed to the wastegate system to further diagnose the degraded condition. Method 400 exits after the flag indicating wastegate system degradation is set.

In this way, an EVR may be operated so that vacuum system leaks and degradation may be determined with fewer sensors. Further, the EVR may be operated while an engine is stopped or running so that a vacuum system may be diagnosed during a variety of operating conditions.

It should be noted that vacuum and vacuum sensors are mentioned throughout the description. However, pressure sensors may be substituted for vacuum sensors and similar operations may be performed to detect vacuum system degradation.

As will be appreciated by one of ordinary skill in the art, the methods described in FIGS. 4 and 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for diagnosing a vacuum system, comprising:
applying a vacuum to a vacuum reservoir, the vacuum reservoir in pneumatic communication with a wastegate;
providing an indication of vacuum system degradation in response to a decrease in vacuum in a pneumatic passage extending between an electric vacuum regulator and the wastegate; and
setting a flag responsive to the indication of vacuum system degradation.

2. The method of claim 1, where the vacuum is increased via an engine intake manifold before providing the indication of vacuum system degradation.

3. The method of claim 1, where the vacuum is increased via a vacuum pump before providing the indication of vacuum system degradation.

4. The method of claim 1, where the wastegate is coupled to an engine, and where the engine is stopped.

5. The method of claim 3, where the vacuum pump is an electric vacuum pump, and where the electric vacuum pump is activated for a predetermined amount of time or until a predetermined vacuum is reached in the pneumatic passage, where the electric vacuum pump is deactivated after reaching the predetermined vacuum or amount of time, and further performing a pressure decay diagnostic.

6. The method of claim 1, where the wastegate is coupled to an engine, and where the engine is rotating.

7. The method of claim 6, further comprising inhibiting the indication of vacuum system degradation when vacuum consumption from the vacuum system is greater than a threshold amount.

8. The method of claim 1, further comprising delaying measuring the decrease in vacuum in the pneumatic passage for a predetermined amount of time after applying the vacuum.

9. A method for diagnosing a vacuum system, comprising:
commanding an electric vacuum regulator supplying vacuum to a turbocharger wastegate to a vacuum level during a period of vacuum consumption less than a threshold level,
supplying a brake booster vacuum via a vacuum reservoir; and
diagnosing a condition of vacuum system degradation in response to a vacuum level in a pneumatic passage extending between the electric vacuum regulator and the turbocharger wastegate.

10. The method of claim 9, where the electric vacuum regulator is commanded via a duty cycle of more than 80%, and where the vacuum level is provided via a vacuum pump and where the vacuum level is compared to a predetermined level.

11. The method of claim 9, where the condition of vacuum system degradation is a vacuum leak, and further comprising diagnosing the vacuum leak based on an operating condition of a vacuum pump.

12. The method of claim 9, where the condition of vacuum system degradation is degradation of a pressure sensor, and where degradation of the pressure sensor is based on a difference in output of a sensor measuring wastegate reservoir vacuum and a sensor measuring brake booster vacuum, and where degradation of the pressure sensor is determined after a pressure decay diagnostic is performed.

13. The method of claim 9, where the condition of vacuum system degradation is degradation of the electric vacuum regulator, and where degradation of the electric vacuum regulator is based on a wastegate reservoir vacuum and a brake boost vacuum.

14. The method of claim 9, further comprising adjusting a speed of a vacuum pump during diagnosing the condition of vacuum system degradation.

15. A system, comprising:
an engine; and
a vacuum diagnostic system coupled to the engine, the vacuum diagnostic system comprising:
a vacuum reservoir;
a wastegate in pneumatic communication with the vacuum reservoir via a pneumatic passage;
an electric vacuum regulator positioned along the pneumatic passage between the vacuum reservoir and the wastegate; and
a controller, the controller including instructions for indicating a condition of vacuum system degradation in response to a vacuum between the electric vacuum regulator and the wastegate, and setting a diagnostic flag responsive to the condition.

16. The system of claim 15, further comprising a brake booster in pneumatic communication with the vacuum reservoir and a sensor positioned to measure vacuum in the brake booster.

17. The system of claim 16, further comprising additional instructions for diagnosing degradation of a vacuum sensor.

18. The system of claim 15, further comprising a vacuum pump in pneumatic communication with the vacuum reservoir.

19. The system of claim 18, where the wastegate is coupled to an exhaust of the engine, and where the controller includes further instructions for diagnosing the condition of vacuum system degradation when the engine is stopped.

20. The system of claim 19, where the controller includes further instructions for diagnosing the condition of vacuum system degradation when the engine is running.

* * * * *